(12) United States Patent
Schneider et al.

(10) Patent No.: US 12,686,505 B2
(45) Date of Patent: Jul. 21, 2026

(54) MOBILE AIRCRAFT ARRESTING SYSTEM

(71) Applicant: CURTISS-WRIGHT FLOW CONTROL SERVICE, LLC, Aston, PA (US)

(72) Inventors: Kirk F. Schneider, Springfield, PA (US); Justin Agren, East Norriton, PA (US); Andrew P. Tully, King of Prussia, PA (US)

(73) Assignee: CURTISS-WRIGHT FLOW CONTROL SERVICE, LLC, Aston, PA (US)

( * ) Notice: Subject to any disclaimer, the term of this patent is extended or adjusted under 35 U.S.C. 154(b) by 239 days.

(21) Appl. No.: 18/780,698

(22) Filed: Jul. 23, 2024

(65) Prior Publication Data

US 2026/0028137 A1     Jan. 29, 2026

(51) Int. Cl.
    *B64F 1/02*        (2006.01)
    *B64U 70/30*       (2023.01)
(52) U.S. Cl.
    CPC .............. *B64F 1/029* (2020.01); *B64U 70/30* (2023.01)
(58) Field of Classification Search
    CPC ................................ B64F 1/029; B64U 70/30
    See application file for complete search history.

(56) References Cited

U.S. PATENT DOCUMENTS

| | | | | |
|---|---|---|---|---|
| 3,309,043 A | * | 3/1967 | Strance ................... | B64F 1/029 244/110 A |
| 4,674,711 A | | 6/1987 | Reid | |
| 2008/0203225 A1 | | 8/2008 | Brandt | |

FOREIGN PATENT DOCUMENTS

| | | | | | |
|---|---|---|---|---|---|
| CN | 1914426 A | * | 2/2007 | ............ | F15B 20/008 |
| CN | 110304238 A | * | 10/2019 | .............. | B64C 9/08 |
| CN | 117401208 A | | 1/2024 | | |

* cited by examiner

*Primary Examiner* — Drew J Brown
(74) *Attorney, Agent, or Firm* — Chrisman Gallo Tochtrop LLC

(57) ABSTRACT

A mobile aircraft arresting system includes a chassis; a rotatable reel supported by the chassis; a wheel system for supporting the chassis, the wheel system including a first wheel and a second wheel; a lifting system that adjustably couples the wheel system to the chassis; and a locking system. The lifting system is operable between a first configuration that arranges the chassis in a raised position, a second configuration that arranges the chassis in a lowered position, and an intermediate configuration that arranges the chassis in an intermediate position between the raised position and lowered position. The locking system is operable to the lock the lifting system in the intermediate configuration.

20 Claims, 9 Drawing Sheets

MOBILE AIRCRAFT ARRESTING SYSTEM

FIELD OF THE DISCLOSURE

The present disclosure relates to a mobile aircraft arresting system and more particularly, a mobile aircraft arresting system comprising a chassis, a wheel system for supporting the chassis, and a rotatable reel mounted to the chassis.

BACKGROUND

A conventional mobile aircraft arresting system typically includes a chassis, a plurality of wheels for movably supporting the chassis, and a rotatable reel mounted to the chassis that carries a length of tape wound thereabout. The system can further include a raising/lowering mechanism that enables the chassis to be adjusted between a first configuration in which the chassis is lifted off the ground and supported by the wheels, and a second configuration in which the chassis rests directly on the ground.

To configure the system for arresting aircraft, the chassis can be set to its first configuration such that the chassis is supported by the wheels and can be towed to a side of a runway. The chassis can then be dropped to its second configuration and anchored to the ground. During an arresting event, the tape can then be pulled from the reel across a runway and secured to another anchored structure on an opposite side of the runway. Moreover, the arresting system includes a hydraulic braking system that can apply braking force to the reel to inhibit further payout of the tape. The tape can then engage a tailhook of the aircraft as it travels down the runway to arrest the aircraft.

It is sometimes desirable to load the system into a shipping container for delivery to another location. The first configuration can enable the system to be easily rolled into an ISO (International Organization for Standardization) shipping container. However, the height of the system in its first configuration is often too tall for such containers. That is, the chassis must be elevated a sufficient degree in its first configuration such that the chassis has sufficient clearance underneath for towing, but this typically results in the system being too tall for standard ISO shipping containers. Moreover, it can be difficult to load the system into a shipping container if the chassis is grounded in the second configuration and cannot be rolled into the container.

Other drawbacks of conventional mobile aircraft arresting systems relate to their hydraulic source. More specifically, conventional systems typically comprise various hydraulic components (e.g., the raising/lowering mechanism, braking system, etc.) and an on-board hydraulic system that is supported by the chassis and operable to supply hydraulic fluid to its hydraulic components. However, failure of this hydraulic system can render the hydraulic components inoperable.

BRIEF SUMMARY OF THE INVENTION

According to a first aspect, a mobile aircraft arresting system includes a chassis; a rotatable reel supported by the chassis; a wheel system for supporting the chassis, the wheel system including a first wheel and a second wheel; a lifting system that adjustably couples the wheel system to the chassis; and a locking system. The lifting system is operable between a first configuration that arranges the chassis in a raised position, a second configuration that arranges the chassis in a lowered position, and an intermediate configuration that arranges the chassis in an intermediate position between the raised position and lowered position. The locking system is operable to the lock the lifting system in the intermediate configuration.

According to a second aspect, a mobile aircraft arresting system includes mobile aircraft arresting system includes a chassis; a rotatable reel supported by the chassis; a wheel system for supporting the chassis; a hydraulic component; and a hydraulic system supported by the chassis and operable to supply hydraulic fluid to the hydraulic component. The hydraulic system includes a fluid reservoir for containing hydraulic fluid; a first supply line and second supply line for supplying the hydraulic fluid from the fluid reservoir to the hydraulic component, the second supply line being downstream of the first supply line; and a first return line and second return line for returning the hydraulic fluid from the hydraulic component to the fluid reservoir, the second return line being downstream of the first return line. The hydraulic system further includes a first fluid connector that is connectable to an external supply line of an external hydraulic system, a second fluid connector that is connectable to an external return line of the external hydraulic system, and first and second valve assemblies. The first valve assembly is operable to assume a primary configuration that provides communication between the first supply line and the second supply line, and an auxiliary configuration that provides communication between the first fluid connector and the second supply line. The second valve assembly is operable to assume a primary configuration that provides communication between the first return line and the second return line, and an auxiliary configuration that provides communication between the second fluid connector and the first return line.

DETAILED DESCRIPTION

Figure 1:
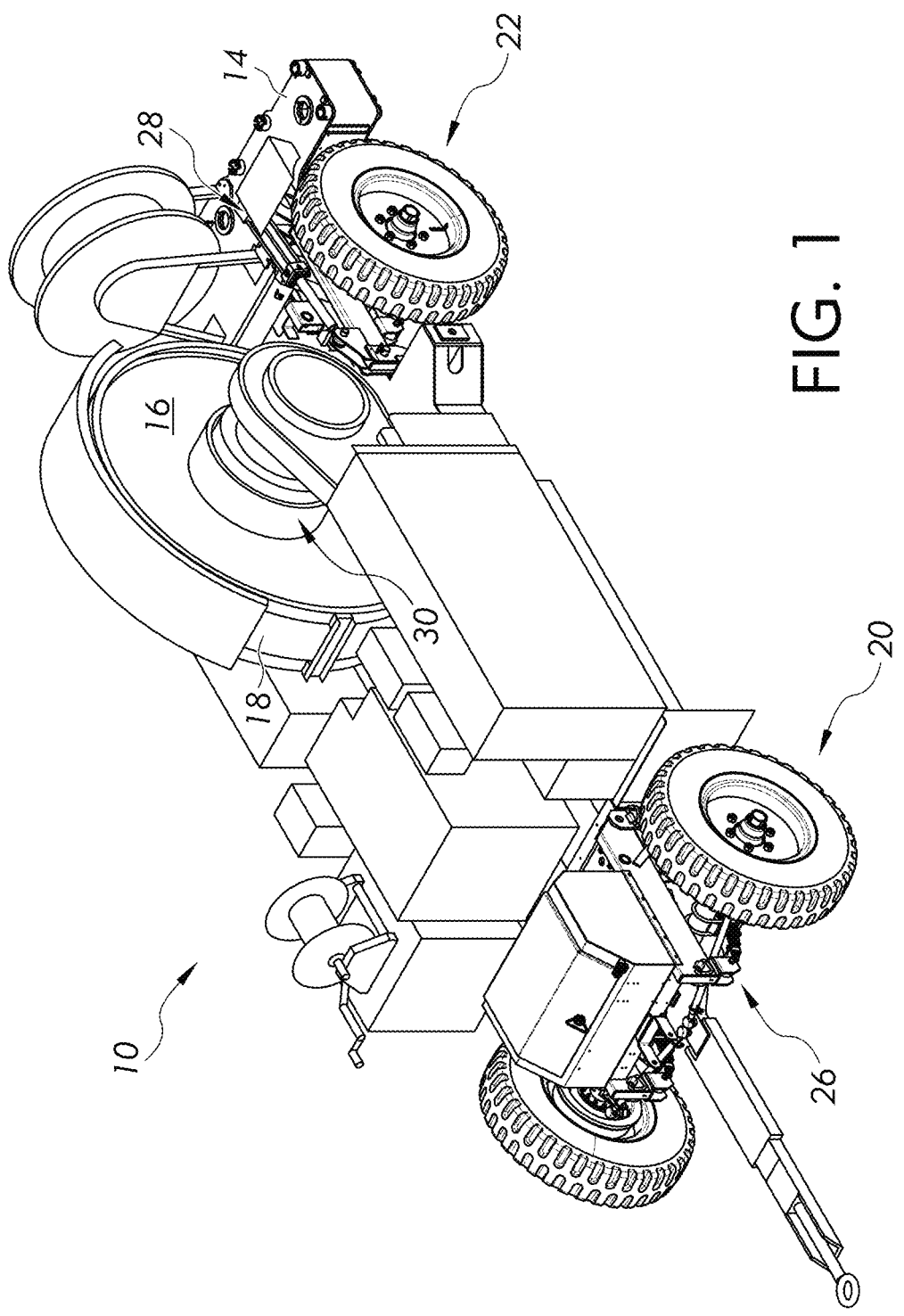
FIG. 1 is a perspective view of an example mobile aircraft arresting system, wherein a chassis of the arresting system is in a raised position.

Turning to FIG. 1, an example mobile aircraft arresting system 10 includes a chassis 14 and a rotatable reel 16 that is supported by the chassis 14 and has a length of tape 18 wound thereabout. In particular, the tape 18 is an elongated woven webbing of material (e.g., nylon) having a proximal end that is attached to a core of the reel 16. The tape 18 is then wrapped around the core of the reel 16 multiple times, such that its distal end is exposed and can be pulled from the reel 16. Optionally, a metal pendant cable (not shown) can be attached to the distal end of the tape 18.

Figure 2:
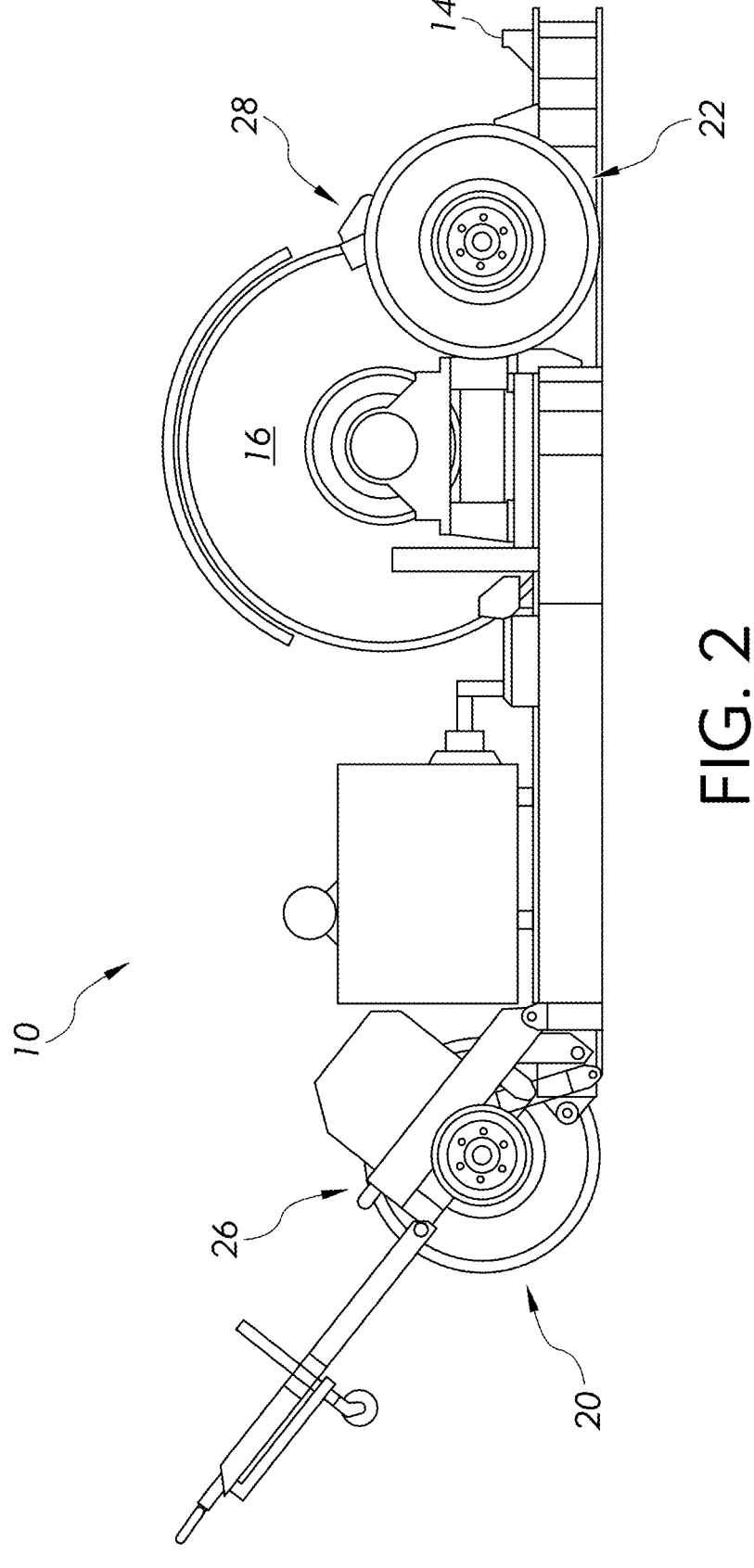
FIG. 2 is a side view of the mobile aircraft arresting system, wherein the chassis is in a lowered position.

The arresting system 10 further includes front and rear wheel systems 20, 22 for movably supporting the chassis 14 such that the chassis 14 can be towed by another vehicle. As discussed below in further detail, the arresting system 10 includes front and rear lifting systems 26, 28 that adjustably couple the front and rear wheel systems 20, 22 to the chassis 14 and are operable to adjust the height of the chassis 14 at its front and rear ends, respectively. In particular, the front and rear lifting systems 26, 28 are operable to adjust the chassis 14 between a raised position (shown in FIG. 1) in which the chassis 14 is lifted off the ground and supported by the front and rear wheel systems 20, 22, and a lowered position (see FIG. 2) in which the chassis 14 rests on the ground and supports the front and rear wheel systems 20, 22.

To configure the system 10 for arresting aircraft, the chassis 14 can be set to its raised position such that the chassis 14 is supported by the front and rear wheel systems 20, 22 and can be towed to a side of a runway. The chassis 14 can then be dropped to its lowered position and anchored to the ground (see, FIG. 2). During an arresting event, a metal pendant attached to the distal end of the tape 18 can be pulled across a runway and secured to another anchored structure on an opposite side of the runway. Notably, the tape 18 will payout from the reel 16 as the metal pendant is pulled across the runway. Moreover, the arresting system 10 includes a hydraulic braking system 30 that can selectively apply braking force to the reel 16 to inhibit further payout of the tape 18 and metal pendant. The braking force can be applied before or after the pendant has engaged a tailhook of the aircraft as it travels down the runway, thereby arresting the aircraft.

Figure 3:
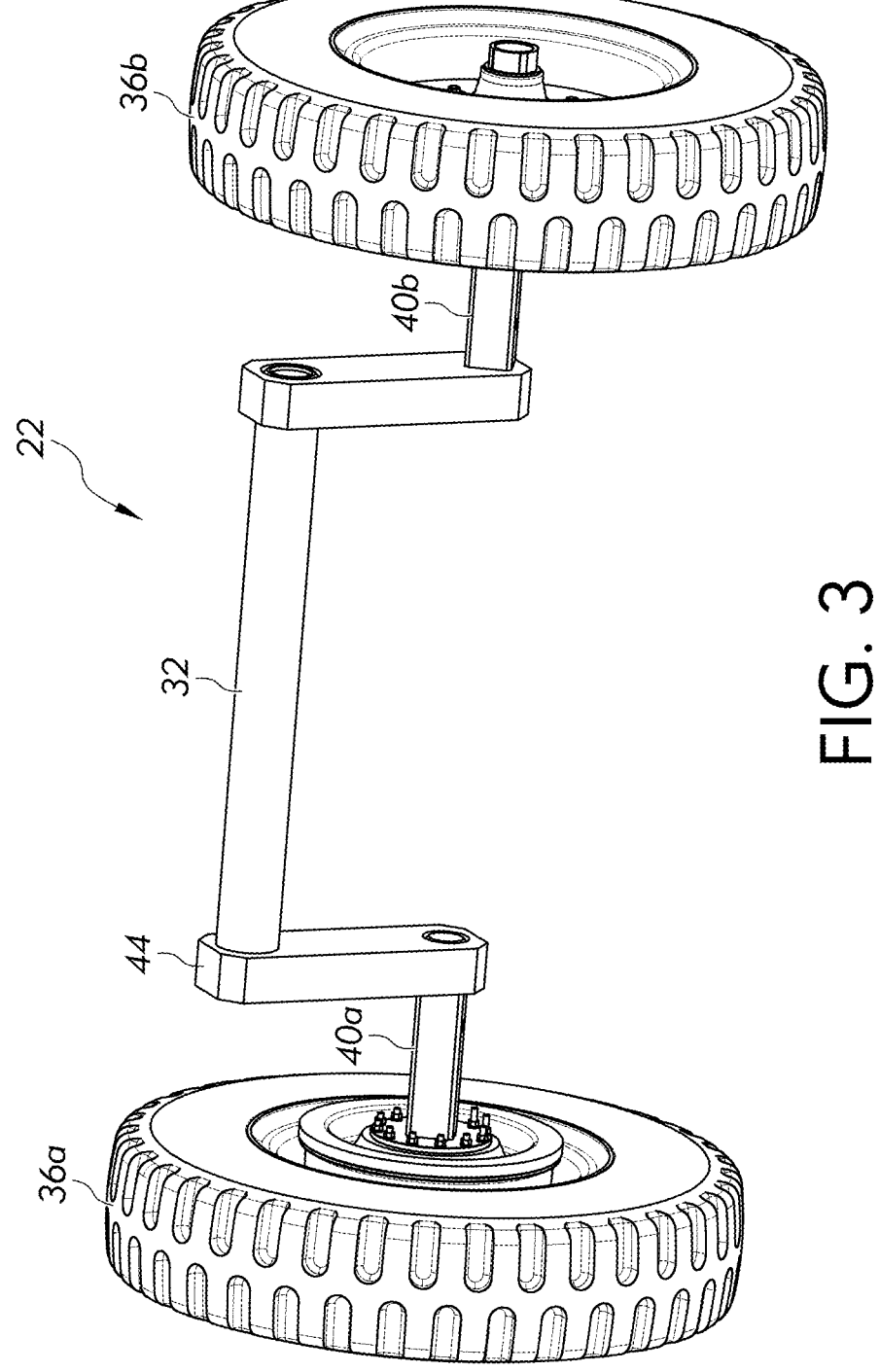
FIG. 3 is a perspective view of a rear wheel system of the mobile aircraft arresting system.

The rear wheel system 22 and rear lifting system 28 will now be described in further detail. As shown in the FIG. 3, the rear wheel system 22 includes an support shaft 32 and left and right wheels 36a, 36b that are rotatably coupled to opposite ends of the support shaft 32. In particular, the support shaft 32 includes a left arm portion 40a having the left wheel 36a rotatably coupled thereto, a right arm portion 40b having the right wheel 36b rotatably coupled thereto, and a U-shaped center portion 44. One leg of the U-shaped center portion 44 is fixed to the left arm portion 40a and another leg of the U-shaped center portion 44 is fixed to the right arm portion 40b.

However, the rear wheel system 22 may comprise other configurations without departing from the scope of the disclosure. For instance, the rear wheel system 22 may comprise a straight support shaft (not shown) in some examples. Moreover, in some embodiments, the rear wheel system 22 may comprise separate support shafts (not shown) that are respectively attached to the left and right wheels 36a, 36b. Broadly speaking, the rear wheel system 22 can comprise any configuration having an support shaft and one or more wheels rotatably coupled to the support shaft.

Figure 4:
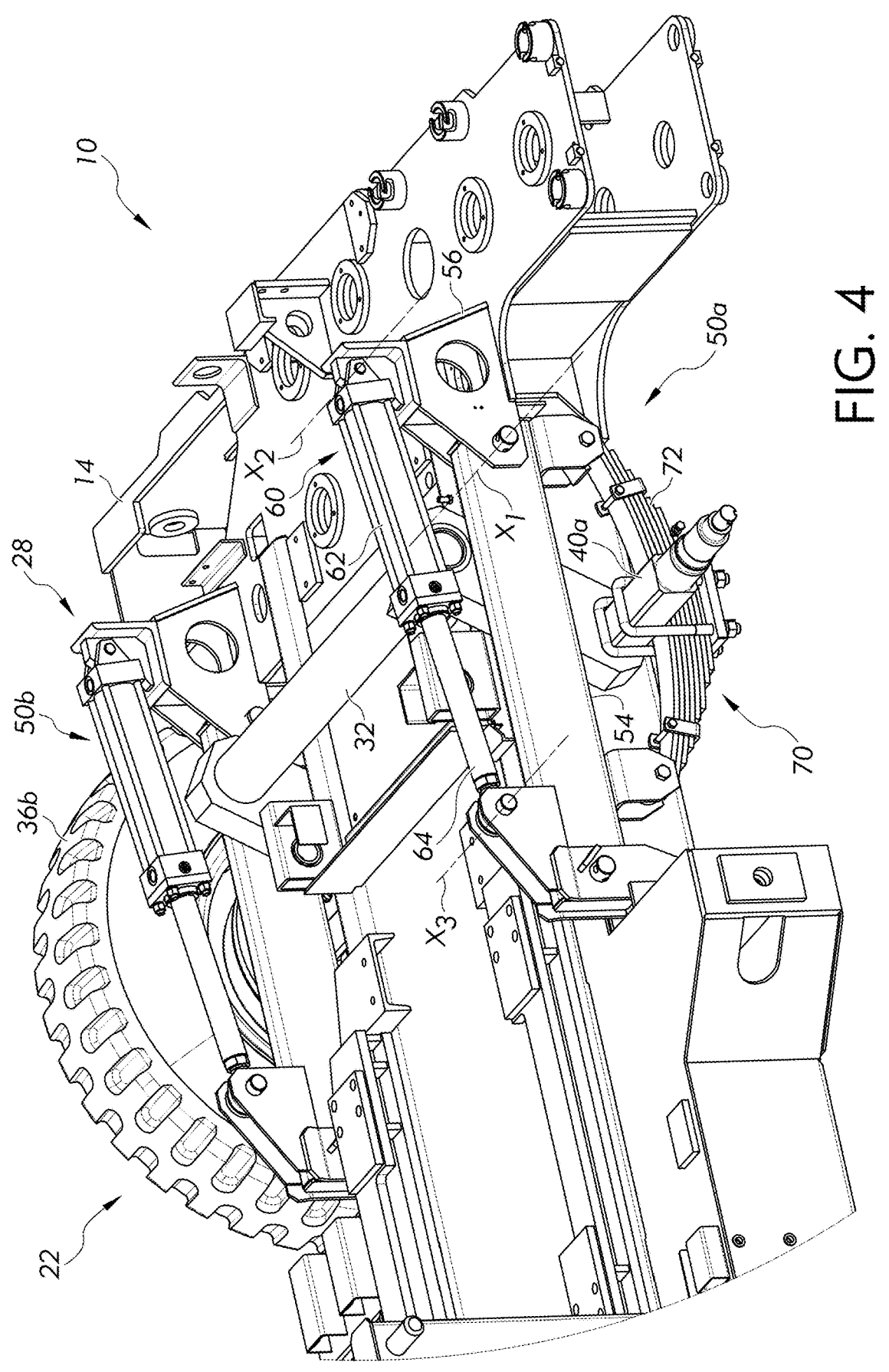
FIG. 4 is an enlarged view of a rear lifting system of the mobile aircraft arresting system, wherein the rear lifting system is in a first configuration that arranges the chassis in the raised position in FIG. 1.

As shown in FIG. 4, the rear lifting system 28 comprises left and right sub-assemblies 50a, 50b that adjustably couple the chassis 14 to the support shaft 32 of the rear wheel system 22. The details of the left sub-assembly 50a and its adjustable coupling of the chassis 14 to the left arm portion 40a are described below. However, it is to be appreciated that the right sub-assembly 50b has a similar but mirrored configuration, and adjustably couples the chassis 14 to the right arm portion 40b in a similar manner. Accordingly, for brevity, the right sub-assembly 50b is not described in detail hereinbelow.

The left sub-assembly 50a comprises a beam 54 that is pivotally coupled at its proximal/rear end to an anchor portion 56 of the chassis 14. The left sub-assembly 50a further comprises a hydraulic cylinder 60 having a barrel 62 and a piston 64 that is translatable relative to the barrel 62. A proximal/rear end of the barrel 62 is pivotally coupled to the anchor portion 56 of the chassis 14. Meanwhile, a distal end of the piston 64 is pivotally coupled to a distal end of the beam 54.

Notably, the beam 54 and cylinder 60 are both pivotally coupled to the anchor portion 56 but at different locations. As such, the pivot axes $X_1$, $X_2$ for the beam 54 and cylinder 60 are substantially parallel to each other but offset, such that the pivot axis $X_2$ of the cylinder 60 is higher than and rearward from the pivot axis $X_1$ of the beam 54. Meanwhile, the pivot axis $X_3$ of the piston 64 relative to the beam 54 is substantially parallel to and offset from the pivot axes $X_1$, $X_2$ for the beam 54 and cylinder 60. Accordingly, translation of the piston 64 relative to the barrel 62 will cause the beam 54 and cylinder 60 to pivot about the anchor portion 56 of the chassis 14. Specifically, extension of the piston 64 will cause the beam 54 and cylinder 60 to pivot downward (as viewed in FIG. 4), while retraction of the piston 64 will cause the beam 54 and cylinder 60 to pivot upward (as viewed in FIG. 4).

The left sub-assembly 50a further includes a suspension system 70 that movably couples the left arm portion 50a of the rear wheel system 22 to the beam 54. In particular, the suspension system 70 comprises a plurality of leaf springs 72 that are coupled to the beam 54 such that the leaf springs 72 can flexibly move relative to the beam 54. Moreover, the left arm portion 50a is fixed to the leaf springs 72 such that the left arm portion 50a can move with the leaf springs 72 relative to the beam 54.

The suspension system 70 may comprise other mechanisms for movably coupling the left arm portion 50a to the beam 54 without departing from the scope of the disclosure. For instance, the suspension system 70 can comprise a shock absorber (not shown) and coil spring (not shown) that movably couple the left arm portion 50a to the beam 54. Moreover, in some examples, the left arm portion 50a can be fixed directly to the beam 54 without any suspension system.

FIG. 4 shows the left sub-assembly 50a in a first configuration in which the piston 64 is fully extended and the beam 54 is generally horizontal. In this configuration, the rear wheel system 22 will be lower than the chassis 14, thus lifting the chassis 14 to the raised position shown in FIG. 1. That is, the left-rear tire 36a (omitted in FIG. 4) will rest on the ground, thereby supporting the left arm portion 40a of the support shaft 32 attached thereto. The left arm portion 40a will exert an upward lifting force on the leaf springs 72 of the left sub-assembly 50a, which in turn exerts an upward lifting force on the chassis 14 that holds the chassis 14 in the raised position.

Figure 5:
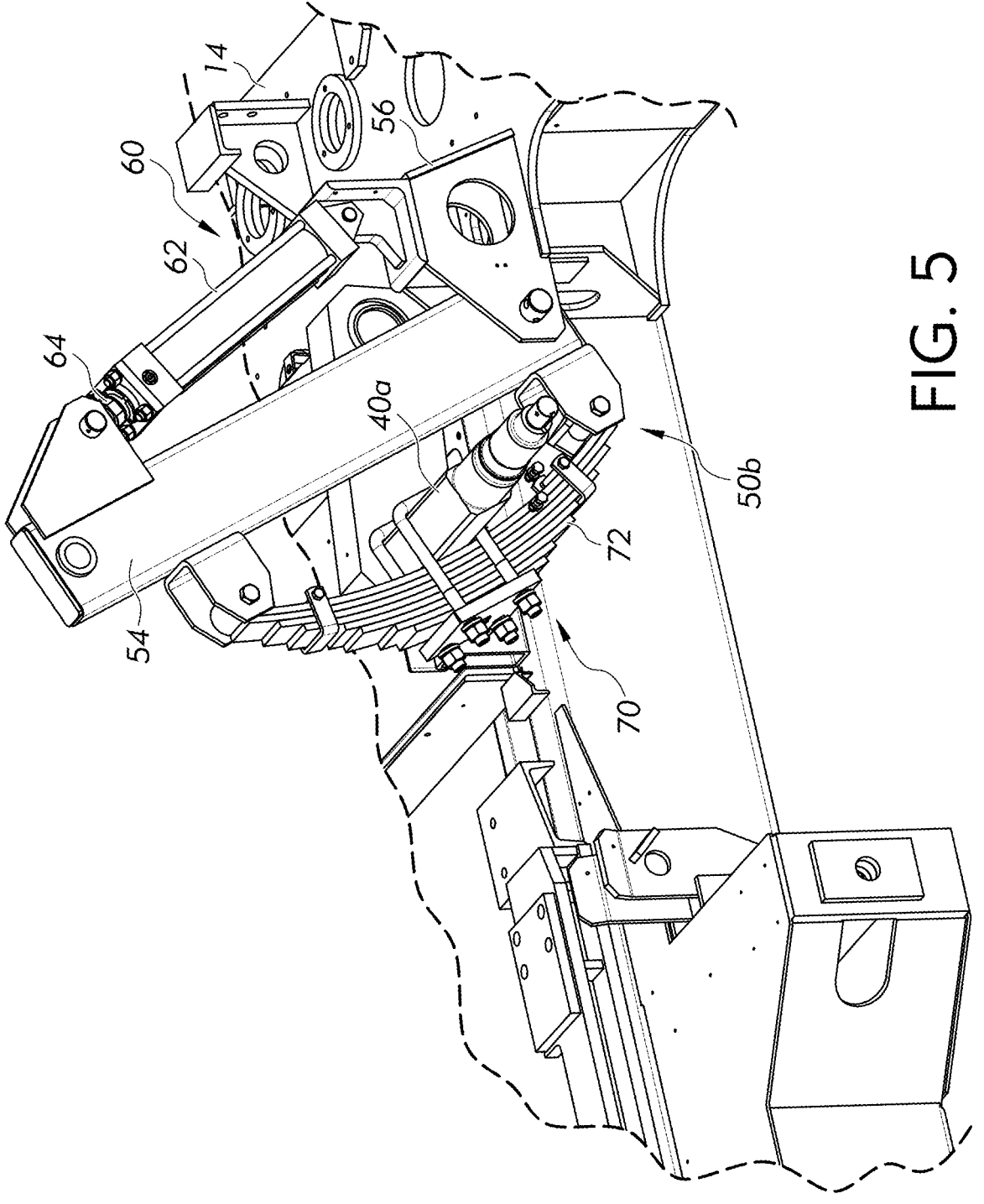
FIG. 5 is an enlarged view of the rear lifting system in a second configuration that arranges the chassis in the lowered position in FIG. 2.

To drop the chassis 14 to its lowered position, the cylinder 60 of the left sub-assembly 50a can be operated to fully retract the piston 64 such that the left sub-assembly 50a assumes a second configuration shown in FIG. 5. That is, retraction of the piston 64 from the first configuration shown in FIG. 4 will cause the left sub-assembly 50a (and rear wheel system 22 coupled thereto) to pivot upward about the anchor portion 56. Once the piston 64 is fully retracted as shown in FIG. 4, the rear wheel system 22 will be elevated relative to the bottom of the chassis 14. As configured, the chassis 14 will therefore rest on the ground.

As discussed above, the rear wheel system 22 will support the chassis 14 in its raised position. Conversely, the chassis 14 will rest directly on the ground in its lowered position, and will support the rear wheel system 22. That is, the anchor portion 56 of the chassis 14 will exert an upward lifting force on the left sub-assembly 50*a*, which in turn will exert an upward lifting force on the rear wheel system 22 that holds the rear wheel system 22 slightly elevated above the ground. Moreover, the cylinder 60 of the left sub-assembly 50*a* will exert a tensile force on the distal end of the beam 54 that prevents the left sub-assembly 50*a* (and rear wheel system 22 coupled thereto) from pivoting downward.

It is sometimes desirable to load the arresting system 10 into a shipping container for delivery to another location. The raised position of the chassis 14 shown in FIG. 1 can enable the system 10 to be easily rolled into a standard ISO shipping container. However, the height of the system 10 in this configuration can be too tall for such containers. Moreover, it can be difficult to load the system 10 into a shipping container if the chassis 14 is grounded in the lowered position shown in FIG. 2 and cannot be rolled into the container.

Figure 6:
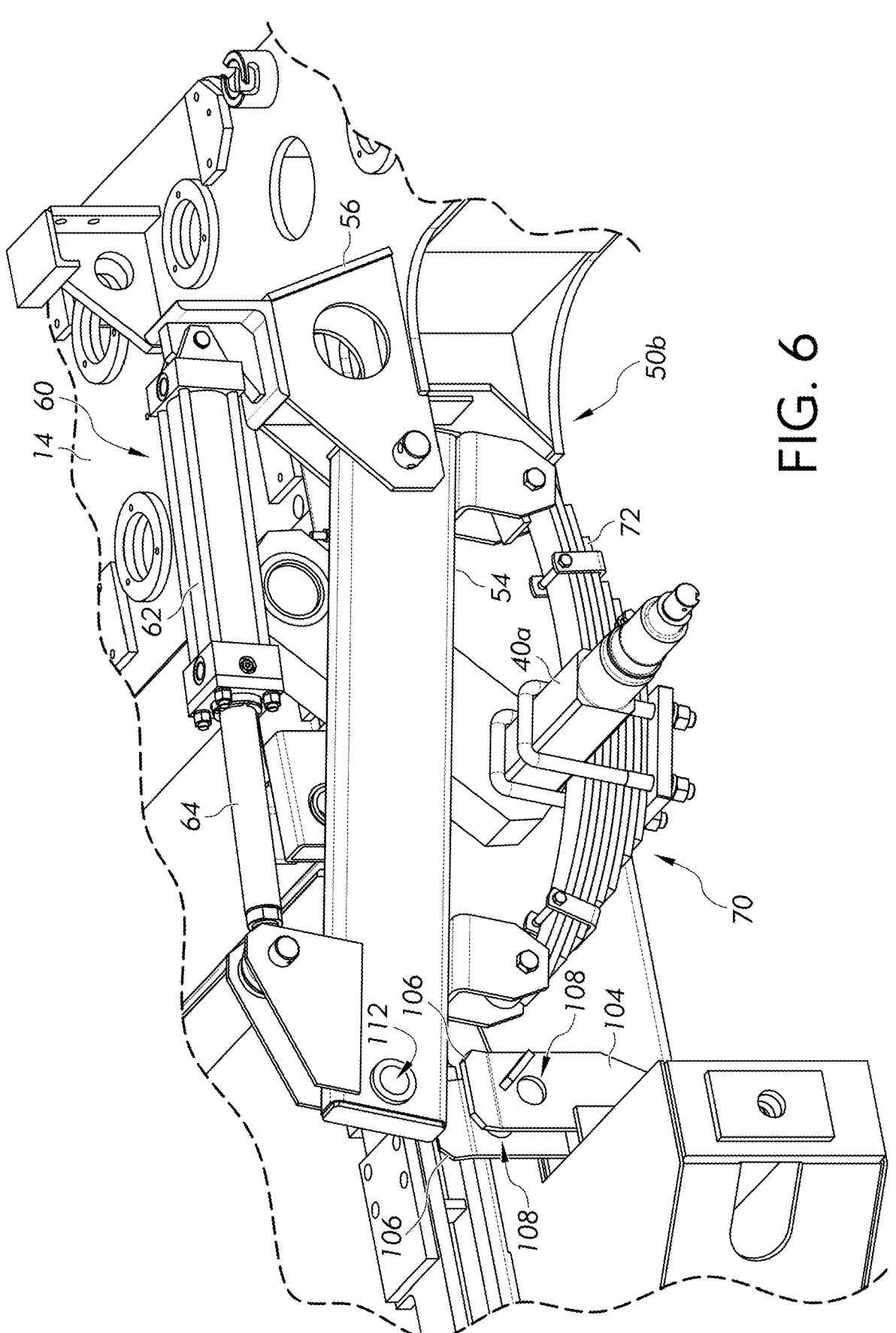
FIG. 6 is an enlarged view of the rear lifting system in an intermediate configuration that arranges the chassis in an intermediate position between the raised and lowered positions.

Accordingly, the left sub-assembly 50*a* of the system 10 is operable such that the chassis 14 can assume an intermediate position that is lower than the raised position but still elevated off the ground and movably supported by the rear wheel system 22. More specifically, the cylinder 60 of the left sub-assembly 50*a* can be operated to adjust its piston 64 such that the left sub-assembly 50*a* assumes an intermediate configuration shown in FIG. 6. That is, the piston 64 can be adjusted (e.g., retracted or extended) such that the piston 64 assumes an intermediate state between its fully extended state (see FIG. 4) and its fully retracted state (see FIG. 5). In the configuration shown in FIG. 6, the piston 64 will be almost fully extended and the beam 54 will be almost horizontal. Moreover, the wheels 36*a*, 36*b* of the rear wheel system 22 will extend slightly below the chassis 14 and thus elevate the chassis 14 slightly off the ground. This intermediate configuration can thus lower the height of the system 10 and enable it to be rolled into a standard ISO shipping container.

Figure 7:
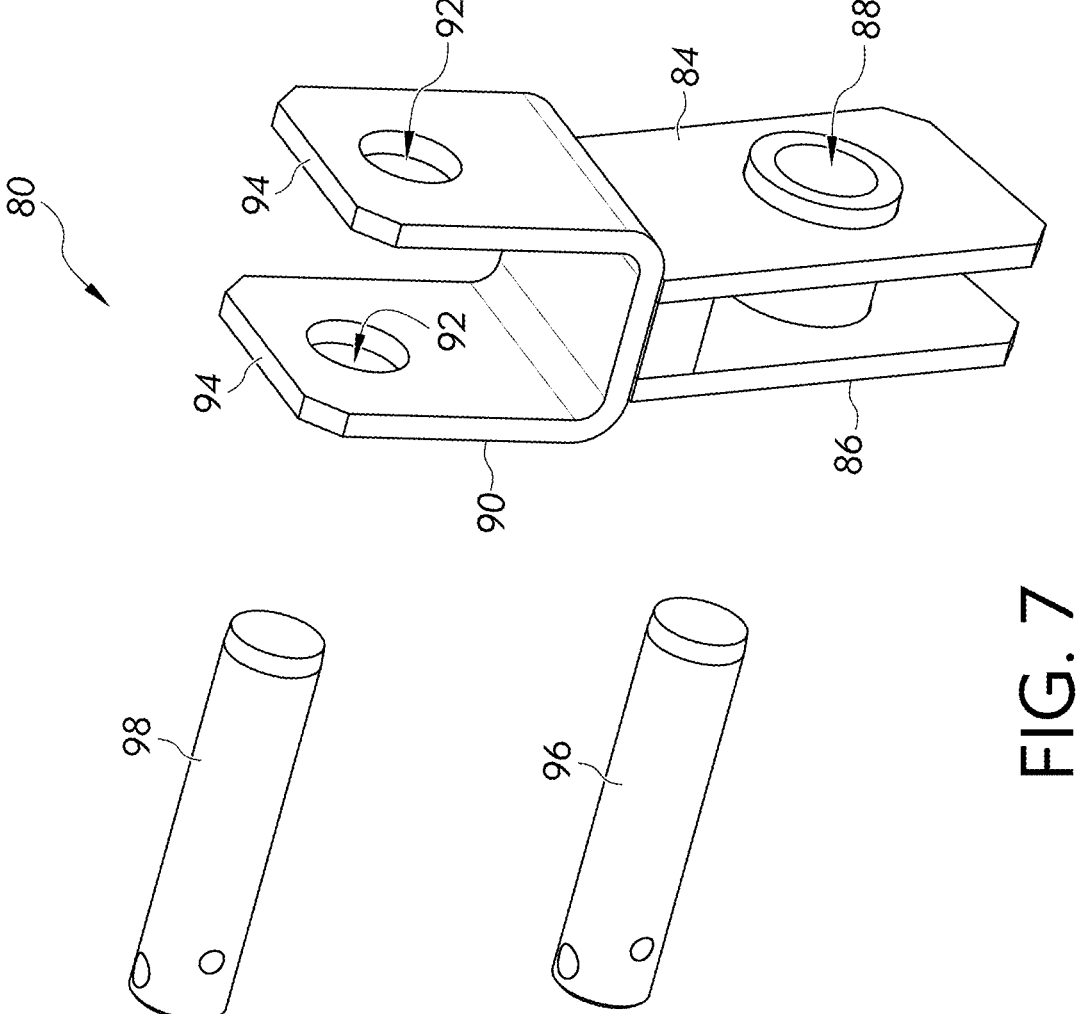
FIG. 7 is an exploded view of a locking system of the mobile aircraft arresting system of FIG. 1.

Notably, the cylinder 60 of the left sub-assembly 50*a* must exert and withstand a significant amount of force to assume the first and intermediate and configurations described above and lift the chassis 14 off the ground. Maintaining that level of force for a substantial length of time can damage the cylinder 60. Moreover, if the cylinder 60 loses hydraulic pressure, the chassis 14 may drop to its lowered position, which could damage equipment and/or be dangerous to personnel. Accordingly, as shown in FIG. 7, the arresting system 10 further includes a locking system 80 that is operable to lock the left sub-assembly 50*a* in its first and intermediate configurations and thus relieve the cylinder 60 from force (it is to be appreciated that the arresting system 10 further includes a similar locking system for right sub-assembly 50*b*).

More specifically, the locking system 80 includes a bracket 84 having a lower portion 86 that defines a lower bracket aperture 88, and an upper portion 90 that defines a pair of upper bracket apertures 92. In particular, the upper portion 90 comprises a pair of wall members 94 that are spaced from each other and define the upper bracket apertures 92. The locking system 80 further includes a first pin

96 that is insertable through the lower bracket aperture 88, and a second pin 98 that is insertable through upper bracket apertures 92.

The chassis 14 and left sub-assembly 50*a* of the system 10 meanwhile comprise various structure for engagement with the components of the locking system 80. More specifically, as shown best in FIG. 6, the chassis 14 includes an anchor portion 104 comprising a pair of wall members 106 that are spaced from each other and define a pair of chassis apertures 108. Moreover, the beam 54 of the left sub-assembly 50*a* defines a beam aperture 112. The engagement of these features with the locking system 80 is shown in FIGS. 8 and 9 and described below.

Figure 8:
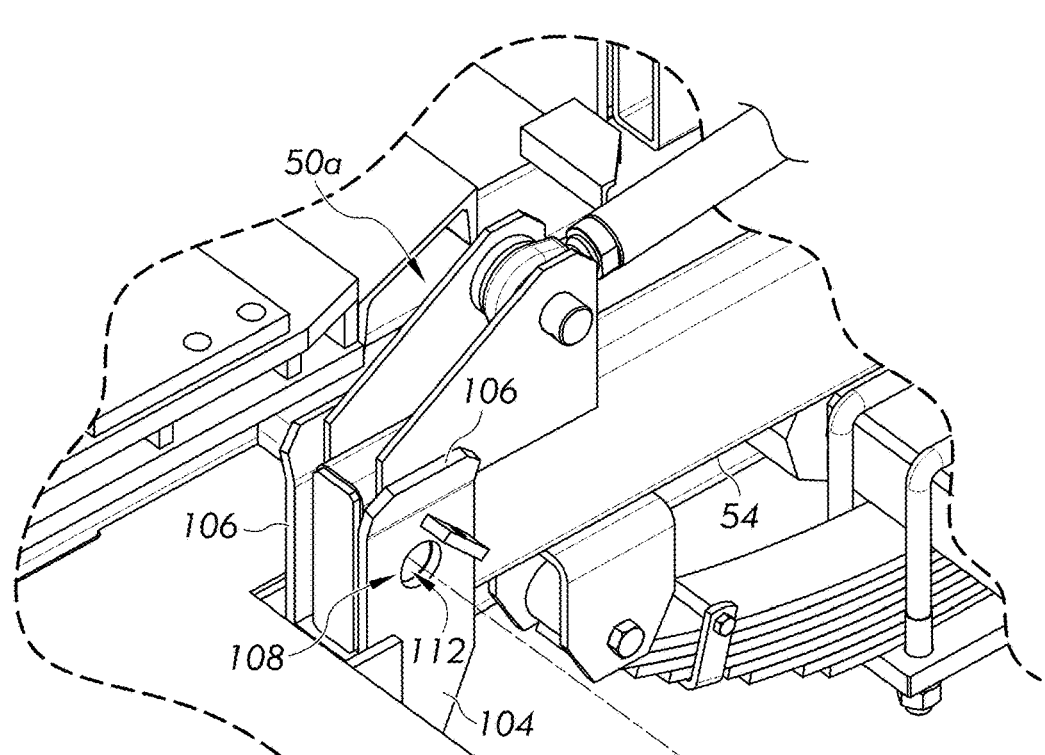
FIG. 8 is an enlarged, exploded view of the rear lifting system with a first locking pin of the locking system in FIG. 7, wherein the rear lifting system is in the first configuration.

More specifically, FIG. 8 shows the left sub-assembly 50*a* in its first configuration. In this configuration, the distal end of the beam 54 will be arranged between the wall members 106 of the anchor portion 104 such that the beam aperture 112 and chassis apertures 108 are coaxially aligned. Moreover, the first pin 96 of the locking system 80 can be inserted through the beam aperture 112 and chassis apertures 108 to lock the left sub-assembly 50*a* in the first configuration. In particular, the first pin 96 will inhibit movement of the beam 54 and cylinder 60 from the first configuration. Thus, hydraulic pressure within the cylinder 60 can be relaxed while the first pin 96 of the locking system 80 maintains the left sub-assembly 50*a* in the first configuration.

Figure 9:
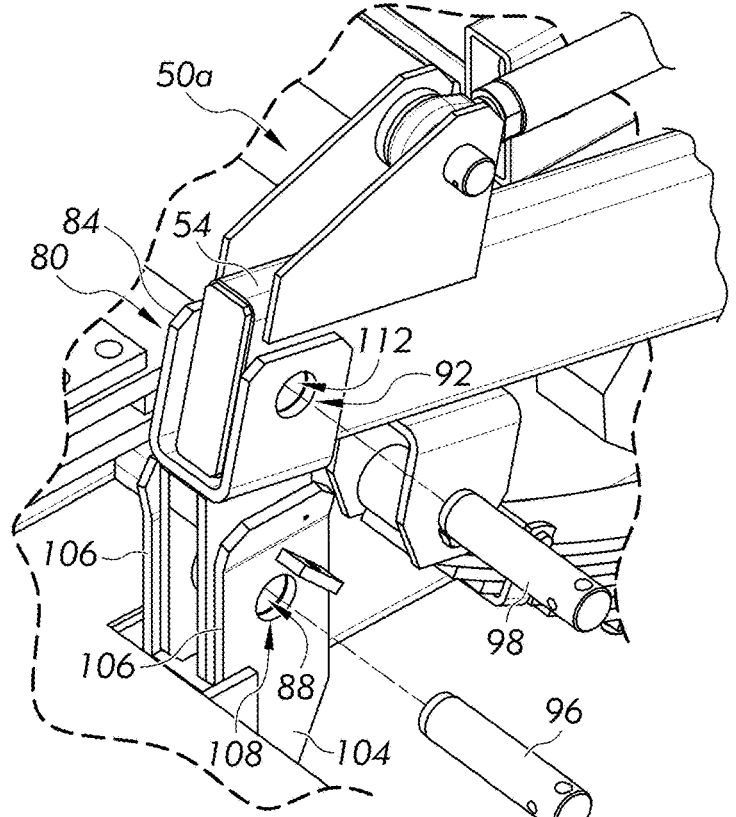
FIG. 9 is an enlarged, exploded view of the rear lifting system with the locking system in FIG. 7, wherein the rear lifting system is in the intermediate configuration.

FIG. 9 shows the left sub-assembly 50*a* in its intermediate configuration. In this configuration, the bracket 84 of the locking system 80 can be arranged such that its lower portion 86 is located between the wall members 106 of the anchor portion 104, and the distal end of the beam 54 is located between the wall members 94 of the bracket's upper portion 90. As arranged, the lower bracket aperture 88 will be coaxially aligned with the chassis apertures 108, and the upper bracket apertures 92 will be coaxially aligned with the beam aperture 112. The first pin 96 of the locking system 80 can then be inserted through the lower bracket aperture 88 and chassis apertures 108, and the second pin 98 can be inserted through the upper bracket apertures 92 and beam aperture 112. The locking system 80, as arranged, will thus lock the left sub-assembly 50*a* in the intermediate configuration. In particular, the locking system 80 will inhibit movement of the beam 54 and cylinder 60 from the intermediate configuration. Accordingly, hydraulic pressure within the cylinder 60 can be relaxed while the locking system 80 maintains the left sub-assembly 50*a* in the intermediate configuration.

The left sub-assembly 50*a* of the rear lifting system 28 described above enables the chassis 14 to be adjusted between a lowered position, a raised position, and an intermediate position between the lowered and raised positions. The lowered position is useful to ground and anchor the chassis 14 for arresting events, while the raised position is useful to elevate the chassis 14 with substantial ground clearance for towing. Meanwhile, the intermediate position is useful for scenarios in which it is desirable for the chassis 14 to be lifted from the ground for towing but the raised position is too high. Moreover, the locking system 80 as described above is useful to lock the left sub-assembly 50*a* in its first and intermediate configurations in order to relieve its cylinder 60 and other components from having to persistently exert/withstand force to maintain those configurations.

However, it is to be appreciated that the configurations of the left sub-assembly 50*a* and locking system 80 can vary without departing from the scope of the disclosure. Indeed, the left sub-assembly 50*a* can comprise any configuration of components (e.g., brackets, levers, motor, transmission, etc.) that movably couples the chassis 14 to the rear wheel system 22 and is operable between a first configuration, a second configuration, and an intermediate configuration. Moreover, the locking system 80 can comprise any structure (e.g., pins, clamps, fasteners, movable stops, etc.) that is operable to selectively lock the left sub-assembly 50a in its raised and intermediate configurations.

As already noted above, the right sub-assembly 50b is similarly configured to adjustably couple the chassis 14 to the right arm portion 40b of the rear wheel system 22. In particular, the right sub-assembly 50b can be similarly operated between a first configuration, a second configuration, and an intermediate configuration between the first and second configurations. Notably, the U-shaped center portion 44 connects that left and right arm portions 40a, 40b, and thus will help move the left and right sub-assemblies 50a, 50b together between their respective configurations. Furthermore, the arresting system 10 has a similar locking system for locking the right sub-assembly 50b in its first and intermediate configurations.

Moreover, it is to be appreciated that the front lifting system 26 of the arresting system 10 may have similar sub-assemblies for adjustably coupling the chassis 14 to the front wheel system 20. Broadly speaking, the left sub-assembly 50a and locking system 80 described above can be implemented for any wheel system and chassis of a portable aircraft arresting system.

Figure 10:
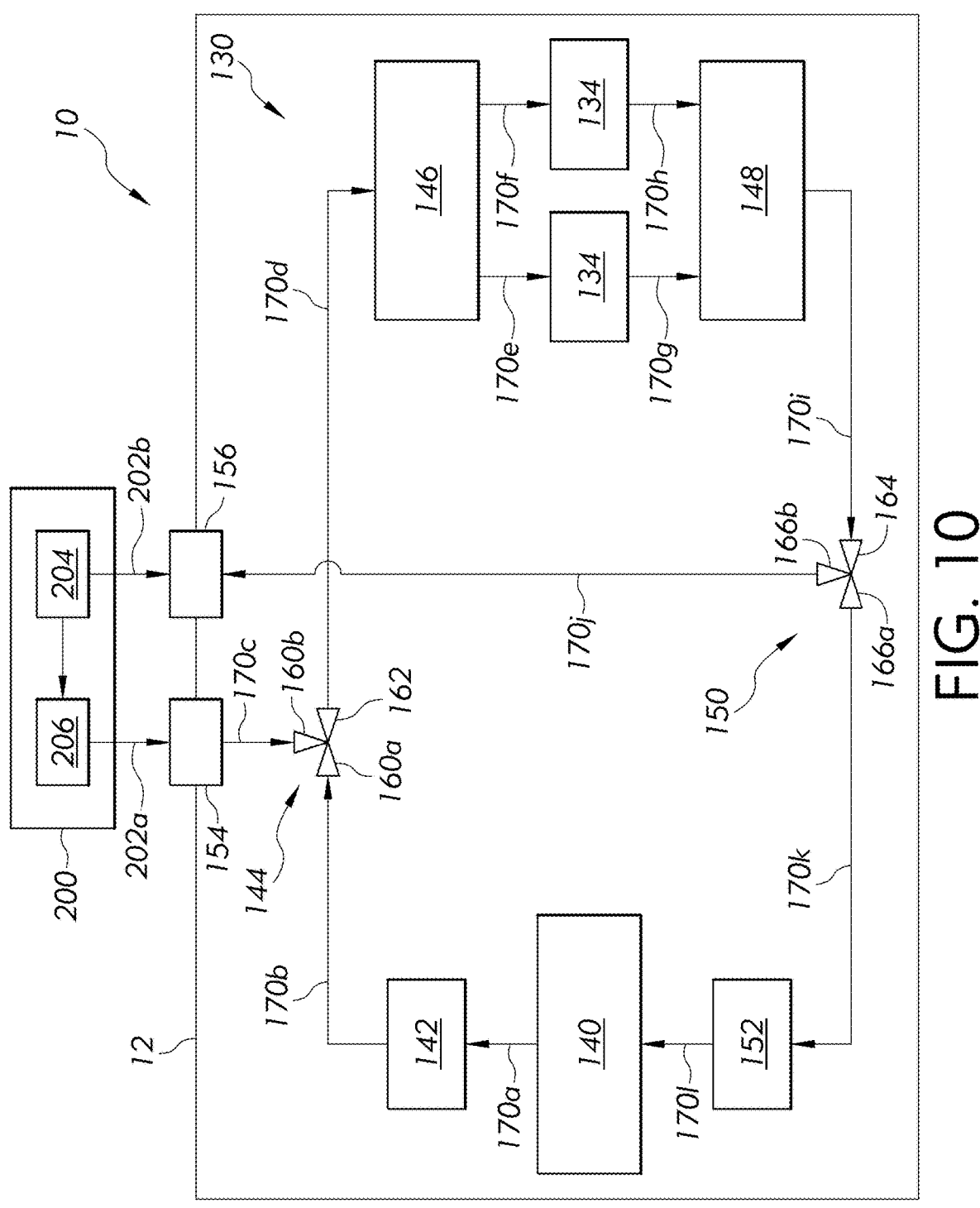
FIG. 10 is a schematic view of a hydraulic system of the mobile aircraft arresting system of FIG. 1.

Turning to FIG. 10, a hydraulic system 130 of the arresting system 10 will now be described. The hydraulic system 130 is configured to supply hydraulic fluid to a plurality of hydraulic components 134 of the arresting system 10. In the present embodiment, the hydraulic components 134 correspond to the cylinders 60 of the left and right sub-assemblies 50a, 50b described above. However, each hydraulic component 134 can comprise any device (e.g., solenoid, brake, actuator, cylinder, valve, etc.) that is hydraulically operated. Moreover, the hydraulic system 130 can be configured to supply hydraulic fluid to any number of one or more hydraulic components without departing from the scope of the disclosure.

The hydraulic system 130 is an on-board system, meaning that all of its components are supported by the chassis 14 of the arresting system 10. The hydraulic system 130 includes a reservoir 140 for containing a hydraulic fluid (e.g., oil), a pump 142, a first valve assembly 144, a supply manifold 146, a return manifold 148, a second valve assembly 150, a filter 152, a first fluid connector 154, and a second fluid 156.

The first valve assembly 144 is a 3-way valve having a first inlet 160a, a second inlet 160b, and an outlet 162. The first valve assembly 144 is adjustable to provide selective communication between its outlet 162 and the first and second inlets 160a, 160b. In particular, the first valve assembly 144 can be operated to assume a primary configuration in which the outlet 162 is in fluid communication with the first inlet 160a and is fluidly isolated from (i.e., does not communicate with) the second inlet 160b. Moreover, the first valve assembly 144 can be operated to assume an auxiliary configuration in which the outlet 162 is in fluid communication with the second inlet 160b and is fluidly isolated from the first inlet 160a.

The second valve assembly 150 is a 3-way valve having an inlet 164, a first outlet 166a, a second outlet 166b. The second valve assembly 150 is adjustable to provide selective communication between its inlet 164 and the first and second outlets 166a, 166b. In particular, the second valve assembly 150 can be operated to assume a primary configuration in which the inlet 164 is in fluid communication with the first outlet 166a and is fluidly isolated from the second outlet 166b. Moreover, the second valve assembly 150 can be operated to assume an auxiliary configuration in which the inlet 164 is in fluid communication with the second outlet 166b and is fluidly isolated from the first outlet 166a.

The hydraulic system 130 further includes a plurality of supply lines 170a-f and a plurality of return lines 170g-l that can establish fluid communication between its components. For the purposes of this disclosure, a "supply line" or "return line" can comprise a pipe, tube, or any other fluid element that is configured to convey fluid therethrough.

The supply line 170a establishes fluid communication between the reservoir 140 and pump 142, the supply line 170b establishes fluid communication between the pump 142 and the first inlet 160a of the first valve assembly 144, the supply line 170c establishes fluid communication between the first fluid connector 154 and the second inlet 160b of the first valve assembly 144, the supply line 170d establishes fluid communication between the outlet 162 of the first valve assembly 144 and the supply manifold 146, and the supply lines 170e, 170f establish fluid communication between the supply manifold 146 and the hydraulic components 134. Moreover, the return lines 170g, 170h establish fluid communication between the hydraulic components 134 and the return manifold 148, the return line 170i establishes fluid communication between the return manifold 148 and the inlet 164 of the second valve assembly 150, the return line 170j establishes fluid communication between the second outlet 166b of the second valve assembly 150 and the second fluid connector 156, the return line 170k establishes fluid communication between the first outlet 166a of the second valve assembly 150 and the filter 152, and the return line 170l establishes fluid communication between the filter 152 and the reservoir 140.

The first and second valve assemblies 144, 150 can be set to their primary configurations in order to establish fluid communication between the reservoir 140 and hydraulic components 134 (e.g., via supply lines 170a, 170b, 170d-f and return lines 170g-i, 170k, 170l). In particular, the primary configurations of the first and second valve assemblies 144, 150 will establish fluid communication between supply lines 170b, 170d and return lines 170i, 170k. Notably, the supply lines 170c, 170d and return lines 170i, 170j will not communicate with each other when the first and second valves assemblies 144, 150 are in their primary configurations.

As configured, the pump 142 can be operated to convey hydraulic fluid from the reservoir 140 through the supply lines 170a, 170b, 170d-f, pump 152, first valve assembly 144, and supply manifold 146 to the hydraulic components 134 to hydraulically operate those components 134. Moreover, the hydraulic fluid will then be discharged from the hydraulic components 134 and conveyed through the return lines 170g-i, 170k, 170l, return manifold 148, second valve assembly 150, and filter 152 back to the reservoir 140.

A failure may sometimes occur in one or more components of the hydraulic system 130. For instance, the pump 142 and/or its control system may encounter a failure that renders the hydraulic system 130 inoperable or inadequate to convey hydraulic fluid to the hydraulic components 134 for operation. Accordingly, the first and second valve assemblies 144, 150 and fluid connectors 154, 156 of the hydraulic system 130 enable an external hydraulic source 200 to be fluidly coupled to the hydraulic components 134 in order to operate the hydraulic components 134 during such failures.

More specifically, an external supply line 202a of the external hydraulic source 200 can be fluidly coupled to the first connector 154 in order to the place the external hydraulic source 200 in fluid communication with the second inlet 160b of the first valve assembly 144. Moreover, an external return line 202b of the external hydraulic source 200 can be fluidly coupled to the second connector 156 in order to the place the external hydraulic system 200 in fluid communication with the second outlet 166b of the second valve assembly 150. The first and second connectors 154, 156 can each comprise a quick-connect coupling, a threaded coupling, or any conventional fluid coupling for connecting hydraulic components (e.g., tubing, nozzles, etc.). In some examples, the first and second connectors 154, 156 may be provided at and form the inlet 160b and outlet 166b of the first and second valve assemblies 144, 150, respectively.

The first and second valve assemblies 144, 150 can then be set to their auxiliary configurations in order to establish fluid communication between the first and second connectors 154, 156 and hydraulic components 134 (e.g., via supply lines 170c-f and return lines 170g-j). In particular, the auxiliary configurations of the first and second valve assemblies 144, 150 will establish fluid communication between supply lines 170b, 170d and return lines 170i, 170k. Notably, the supply lines 170b, 170d and return lines 170i, 170k will not communicate with each other when the first and second valves assemblies 144, 150 are in their auxiliary configurations.

As configured, the external hydraulic source 200 will be in fluid communication with the hydraulic components 134 via the supply lines 170c-f, 200a and return lines 170g-j, 200b. For the purposes of this disclosure, an "external hydraulic source" refers to any hydraulic system components (e.g., reservoir, pump, filter, etc.) that are not supported by its chassis 14 and operable to supply hydraulic fluid to the hydraulic components 134 when fluidly coupled to the first and second valve assemblies 144, 150 in their auxiliary configurations. In the present embodiment, the external hydraulic source 200 includes a reservoir 204 and a pump 206 that can be operated to convey hydraulic fluid from the reservoir 204 through the supply lines 202a, 170c-f, pump 206, first valve assembly 144, and supply manifold 146 to the hydraulic components 134 to hydraulically operate those components 134. Moreover, the hydraulic fluid can then be discharged from the hydraulic components 134 and conveyed through the return lines 170g-j, 202b, return manifold 148, and second valve assembly 150 back to the reservoir 204.

The hydraulic system 130 as described above thus enables the hydraulic components 134 to be hydraulically supplied and operated by its on-board reservoir 140 and pump 142, but also enables the hydraulic components 134 to be hydraulically supplied and operated by an external hydraulic source. However, it is to be appreciated that the hydraulic system 130 may comprise various configurations that provide similar benefits without departing from the scope of the disclosure.

For example, the valve assemblies 144, 150 in the embodiment described above correspond to 3-way valves that can be operated to provide selective communication between their corresponding supply lines 170b-d and return lines 170i-k. In other examples, each valve assembly 144, 150 may comprise a pair of valves (e.g., ball valves) that can be operated similar provide selective communication between the supply lines 170b-d and return lines 170i-k. For instance, the first valve assembly 144 may comprise a first valve that is operable to provide selective communication between the supply lines 170b, 170d, and a second valve that is operable to provide selective communication between the supply lines 170c, 170d. Moreover, the second valve assembly 150 may comprise a first valve that is operable to provide selective communication between the return lines 170i, 170k, and a second valve that is operable to provide selective communication between the return lines 170i, 170j.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A mobile aircraft arresting system comprising:
   a chassis;
   a rotatable reel supported by the chassis;
   a wheel system for supporting the chassis, the wheel system including a first wheel and a second wheel;
   a lifting system that adjustably couples the wheel system to the chassis, wherein the lifting system is operable between a first configuration that arranges the chassis in a raised position, a second configuration that arranges the chassis in a lowered position, and an intermediate configuration that arranges the chassis in an intermediate position between the raised position and lowered position; and
   a locking system that is operable to the lock the lifting system in the intermediate configuration.

2. The mobile aircraft arresting system according to claim 1, wherein:
   the wheel system supports the chassis when the lifting system is in the first configuration, and
   the chassis supports the wheel system when the lifting system is in the second configuration.

3. The mobile aircraft arresting system according to claim 1, wherein the locking system is operable to lock the lifting system in the first configuration.

4. The mobile aircraft arresting system according to claim 1, wherein the lifting system comprises a beam that pivotally couples the wheel system to the chassis.

5. The mobile aircraft arresting system according to claim 4, wherein the locking system comprises a bracket that is operable to fix the beam relative to the chassis in the intermediate configuration.

6. The mobile aircraft arresting system according to claim 5, wherein the locking system comprises a first pin operable to fasten the bracket to the chassis in the intermediate configuration, and a second pin operable to fasten the bracket to the beam in the intermediate configuration.

7. The mobile aircraft arresting system according to claim 6, wherein the first pin is operable to fix the beam relative to the chassis in the first configuration.

8. The mobile aircraft arresting system according to claim 6, wherein:
   the first pin is insertable through a chassis aperture of the chassis and a first bracket aperture of the bracket to fasten the bracket to the chassis in the intermediate configuration, and
   the second pin is insertable through a beam aperture of the beam and a second bracket aperture of the bracket to fasten the bracket to the beam in the intermediate configuration.

9. The mobile aircraft arresting system according to claim 8, wherein the first pin is insertable through the beam aperture of the beam and the chassis aperture of the chassis to fix the beam relative to the chassis in the first configuration.

10. The mobile aircraft arresting system according to claim 4, wherein the lifting system comprises a hydraulic cylinder that is operable to pivot the beam relative to the chassis.

11. The mobile aircraft arresting system according to claim 10, wherein the hydraulic cylinder comprises a body pivotally coupled to the chassis, and a piston that is translatable relative to the body and pivotally coupled to the beam.

12. The mobile aircraft arresting system according to claim 10, wherein the locking system inhibits movement of the beam and hydraulic cylinder from the intermediate configuration.

13. The mobile aircraft arresting system according to claim 4, further comprising a suspension system that movably couples the wheel system to the beam, wherein:
the wheel system includes a support shaft and first and second wheels rotatably coupled to opposite ends of the support shaft, and
the suspension system comprises a plurality of leaf springs flexibly coupled to the beam, wherein the support shaft is fixed to the plurality of leaf springs.

14. The mobile aircraft arresting system according to claim 1, wherein the wheel system comprises a support shaft having:
a first arm portion having the first wheel rotatably coupled thereto,
a second arm portion having the second wheel rotatably coupled thereto, and
a U-shaped portion that connects the first arm portion to the second arm portion.

15. The mobile aircraft arresting system according to claim 1, further comprising a hydraulic system supported by the chassis and operable to supply hydraulic fluid to a hydraulic component of the mobile aircraft arresting system, the hydraulic system comprising:
a fluid reservoir for containing hydraulic fluid,
a first supply line and second supply line for supplying the hydraulic fluid from the fluid reservoir to the hydraulic component, the second supply line being downstream of the first supply line,
a first return line and second return line for returning the hydraulic fluid from the hydraulic component to the fluid reservoir, the second return line being downstream of the first return line,
a first fluid connector that is connectable to an external supply line of an external hydraulic system,
a second fluid connector that is connectable to an external return line of the external hydraulic system,
a first valve assembly that is operable to assume a primary configuration that provides communication between the first supply line and the second supply line, and an auxiliary configuration that provides communication between the first fluid connector and the second supply line,
a second valve assembly that is operable to assume a primary configuration that provides communication between the first return line and the second return line, and an auxiliary configuration that provides communication between the second fluid connector and the first return line.

16. The mobile aircraft arresting system according to claim 15, wherein the first valve assembly and second valve assembly each comprise a 3-way valve.

17. The mobile aircraft arresting system according to claim 15, wherein:
the primary configuration of the first valve assembly fluidly isolates the first fluid connector from the second supply line,
the auxiliary configuration of the first valve assembly fluidly isolates the first supply line from the second supply line,
the primary configuration of the second valve assembly fluidly isolates the second fluid connector from the first return line, and
the auxiliary configuration of the second valve assembly fluidly isolates the first return line from the second return line.

18. The mobile aircraft arresting system according to claim 15, wherein the hydraulic system comprises a pump that is operable to convey the hydraulic fluid from the fluid reservoir to the first supply line.

19. The mobile aircraft arresting system according to claim 15, wherein the component comprises a hydraulic cylinder of the lifting system.

20. A mobile aircraft arresting system comprising:
a chassis;
a rotatable reel supported by the chassis;
a wheel system for supporting the chassis;
a hydraulic component; and
a hydraulic system supported by the chassis and operable to supply hydraulic fluid to the hydraulic component, the hydraulic system comprising:
a fluid reservoir for containing hydraulic fluid,
a first supply line and second supply line for supplying the hydraulic fluid from the fluid reservoir to the hydraulic component, the second supply line being downstream of the first supply line,
a first return line and second return line for returning the hydraulic fluid from the hydraulic component to the fluid reservoir, the second return line being downstream of the first return line,
a first fluid connector that is connectable to an external supply line of an external hydraulic system,
a second fluid connector that is connectable to an external return line of the external hydraulic system,
a first valve assembly that is operable to assume a primary configuration that provides communication between the first supply line and the second supply line, and an auxiliary configuration that provides communication between the first fluid connector and the second supply line,
a second valve assembly that is operable to assume a primary configuration that provides communication between the first return line and the second return line, and an auxiliary configuration that provides communication between the second fluid connector and the first return line.

* * * * *